(12) United States Patent
Elliott

(10) Patent No.: US 10,418,840 B2
(45) Date of Patent: Sep. 17, 2019

(54) INDUCTIVE CHARGER

(71) Applicant: Intelligent Energy Limited, Loughborough (GB)

(72) Inventor: Zachary Elliott, Loughborough (GB)

(73) Assignee: Intelligent Energy Limited, Loughborough (GB)

( * ) Notice: Subject to any disclaimer, the term of this patent is extended or adjusted under 35 U.S.C. 154(b) by 18 days.

(21) Appl. No.: 15/518,943

(22) PCT Filed: Sep. 29, 2015

(86) PCT No.: PCT/GB2015/052826
§ 371 (c)(1),
(2) Date: Apr. 13, 2017

(87) PCT Pub. No.: WO2016/059368
PCT Pub. Date: Apr. 21, 2016

(65) Prior Publication Data
US 2017/0229901 A1   Aug. 10, 2017

(30) Foreign Application Priority Data

Oct. 14, 2014 (GB) .................................. 1418174.7

(51) Int. Cl.
| | |
|---|---|
| *H02J 7/02* | (2016.01) |
| *H02J 7/00* | (2006.01) |
| *H02J 7/34* | (2006.01) |
| *H02J 50/10* | (2016.01) |
| *H02J 1/00* | (2006.01) |

(52) U.S. Cl.
CPC ............ *H02J 7/025* (2013.01); *H02J 7/0044* (2013.01); *H02J 7/02* (2013.01); *H02J 7/34* (2013.01); *H02J 50/10* (2016.02); *H02J 1/00* (2013.01); *H02J 2001/004* (2013.01)

(58) Field of Classification Search
CPC ........... H02J 7/025; H02J 7/0044; H02J 50/10
USPC ........................................................ 320/108
See application file for complete search history.

(56) References Cited

U.S. PATENT DOCUMENTS

| | | | | |
|---|---|---|---|---|
| 8,373,387 | B2 * | 2/2013 | Bourilkov | H02J 7/025 320/108 |
| 8,629,651 | B2 * | 1/2014 | Guccione | H02J 7/0054 320/108 |
| 9,698,632 | B2 * | 7/2017 | Davison | H02J 7/0044 |
| 9,821,672 | B2 * | 11/2017 | Chae | B60L 1/006 |
| 9,847,651 | B2 * | 12/2017 | Swaans | H02J 7/0027 |
| 9,979,236 | B2 * | 5/2018 | Lee | H02J 17/00 |
| 2003/0231001 | A1 * | 12/2003 | Bruning | H02J 7/0054 320/108 |

(Continued)

FOREIGN PATENT DOCUMENTS

| | | |
|---|---|---|
| CN | 203422610 | 2/2014 |
| EP | 1096641 | 5/2001 |

(Continued)

OTHER PUBLICATIONS

International Search Report and Written Opinion in International Patent Application No. PCT/GB2015/052826 dated Dec. 2, 2015.

*Primary Examiner* — M Baye Diao
(74) *Attorney, Agent, or Firm* — BakerHostetler

(57) ABSTRACT

An inductive charger comprising an inductive charging coil for providing energy to a inductive receiving coil; and a fuel cell configured to provide electricity to the inductive charging coil.

11 Claims, 1 Drawing Sheet

(56) References Cited

U.S. PATENT DOCUMENTS

| | | | | |
|---|---|---|---|---|
| 2009/0075704 A1* | 3/2009 | Wang | ............ | H02J 50/10 |
| | | | | 455/573 |
| 2011/0260681 A1* | 10/2011 | Guccione | ............ | H02J 7/0054 |
| | | | | 320/108 |
| 2013/0141037 A1 | 6/2013 | Jenwatanavet et al. | | |
| 2013/0257367 A1 | 10/2013 | Someya | | |
| 2014/0143933 A1 | 5/2014 | Low et al. | | |
| 2017/0095667 A1* | 4/2017 | Yakovlev | ............ | A61N 1/36125 |

FOREIGN PATENT DOCUMENTS

| | | |
|---|---|---|
| JP | 2001-231174 | 8/2001 |
| JP | 2003-255069 | 9/2003 |
| JP | 2005-160253 | 6/2005 |
| JP | 2006-320047 | 11/2006 |

\* cited by examiner

INDUCTIVE CHARGER

CROSS-REFERENCE TO RELATED APPLICATIONS

This patent application is a National Stage Application of international patent application PCT/GB2015/052826 filed Sep. 29, 2015, which claims priority to Great Britain patent application 1418174.7, filed Oct. 14, 2014, the disclosures of which are incorporated by reference in their entirety.

The present disclosure relates to inductive chargers, and in particular to inductive chargers that have a fuel cell for providing electrical energy to the inductive charger.

According to a first aspect of the invention, there is provided an inductive charger comprising:

an inductive charging coil for providing energy to a inductive receiving coil; and a fuel cell configured to provide electricity to the inductive charging coil.

Such an arrangement can be advantageous for inductively charging electronic devices that consume a relatively high level of power, especially when a connection to mains electricity is not available.

The inductive charger may further comprise a housing that houses both the inductive charging coil and the fuel cell. The inductive charger may be portable.

The inductive charger may further comprise a support structure configured to support an electronic device comprising the inductive receiving coil. In this way, the inductive receiving coil can be positioned adjacent to the inductive charging coil, in use.

The support structure may comprise a profiled surface for supporting the electronic device in a predetermined position. The support structure may comprise a profiled surface for supporting the electronic device in a predetermined alignment.

The profiled surface may comprise a curved surface portion. The inductive charging coil may be adjacent to the curved surface portion.

The profiled surface may comprise a curved surface portion and a substantially planar surface portion. The inductive charging coil may be adjacent to the substantially planar surface portion.

The profiled surface may be an outer surface of a cone shaped housing.

The inductive charging coil may be movable along the length of the cone shaped housing. In this way, the inductive charging coil can be associated with regions of the cone shaped housing that have different circumferences.

The electronic device may comprise a wrist-mountable electronic device. The wrist-mountable electronic device may comprise a strap. The support structure may be configured to be engaged with the strap such that the inductive receiving coil is positioned adjacent to the inductive charging coil.

The support structure may comprise a device locating member and a base. The device locating member may house the inductive charging coil and may be configured to be engaged with the strap. The base may house the fuel cell. The device locating member may be a subsection of a hollow cylinder.

The inductive charger may further comprise a movable lid that can move between an open position and a closed position relative to the base. When the lid is in the open position, an electronic device on the device locating member may be visible. When the lid is in the closed position, an electronic device on the device locating member may be obscured from view.

The support structure may comprise indicia that are indicative of the location of the inductive charging coil.

Embodiments of the present invention will now be described by way of example and with reference to the accompanying drawings in which.

Examples disclosed herein relate to an inductive charger that includes a fuel cell for providing electricity to an inductive charging coil. Such an arrangement can be particularly advantageous for inductively charging electronic devices that consume a relatively high level of power, especially when a connection to mains electricity is not available. One or more of the inductive chargers disclosed herein can be particularly well-suited for charging wrist-mountable electronic devices such as wrist watches, although it will be appreciated from the description that follows that examples described herein are not necessarily limited to charging any specific type of electronic device.

Electrically powered wrist watches have hitherto generally been very low power devices capable of running for extended periods of time (e.g. years) on a single conventional button cell using, for example, lithium ion or silver oxide chemistries. More recently, there has been a significant trend towards providing substantially increased functionality on wrist watches and other wrist-mountable electronic devices. Such advanced functionality may not readily or cost-effectively be provided in a satisfactory manner by conventional disposable battery cells.

Figure 1:
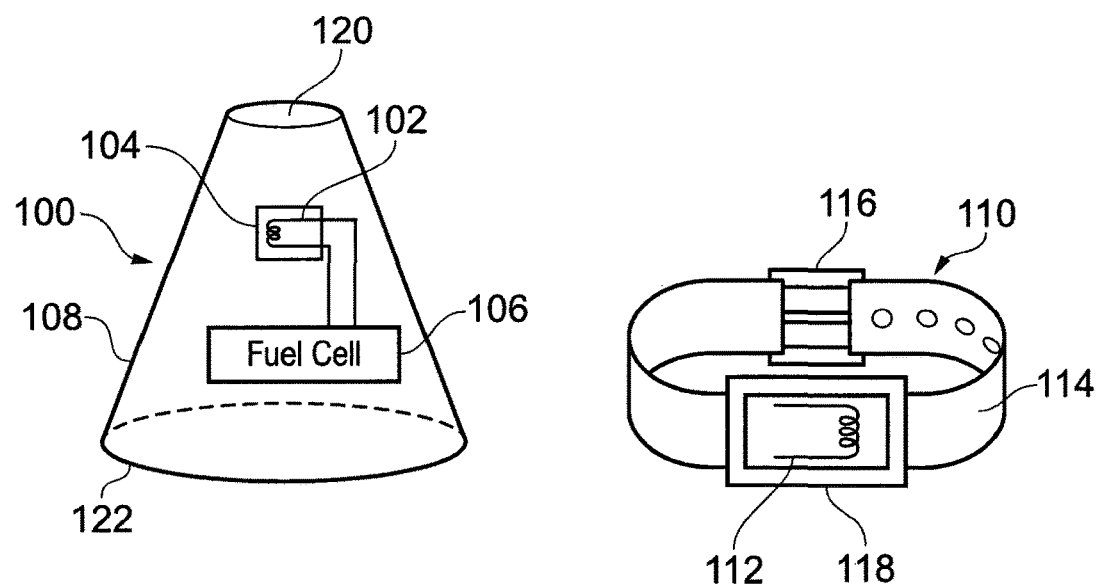
FIG. 1 shows an inductive charger and a wrist watch.

FIG. 1 shows an example of an inductive charger 100 and a wrist watch 110. The wrist watch 110 is an example of a wrist-mountable electronic device that has a battery that can be charged by the inductive charger 100. The wrist watch 110 has a strap 114, which in this example is provided as two lengths of flexible material that are connectable by a buckle or clasp 116. It will be appreciated that other types of strap and fastening mechanisms are known in the art. The strap may comprise any suitable material and construction capable of retaining the wrist watch 110 on the wrist of a user. The wrist watch 110 also has a display panel 118.

The inductive charger 100 includes an inductive charging coil 102 for providing energy to an inductive receiving coil 112 in the wrist watch 110. The inductive receiving coil 112 can be considered as remote from the inductive charging coil 102 inasmuch as the two coils are not in direct electrical contact with each other, and are separated by a housing of the inductive charger 100 and a housing of the wrist watch 110. In this example, the inductive receiving coil 112 is located in an enclosure that houses the display panel 118.

The inductive charger 100 also includes a fuel cell 106 for providing electricity to the inductive charging coil 102, in this example through a wired connection between the fuel cell 106 and the inductive charging coil 102. The inductive charger 100 includes a housing 108 (which may be referred to as a pod) that houses both the inductive charging coil 102 and the fuel cell 106.

The housing 108 may also house a fuel source (not shown) that is capable of delivering fluid fuel, such as hydrogen, to the fuel cell 106. The fuel source may comprise one or more reaction chambers containing one or more reactant compounds capable of being activated to release fluid fuel which can be fed to the fuel cell 106. Examples of suitable compounds include aluminium hydride or sodium borohydride etc, where the activation fluid may be water.

The fuel source may comprise micro-reservoirs of the activation fluid, e.g. water. The fuel sources may be configured as cartridges or micro-cartridges that can be inserted into a receptacle in the inductive charger 100, e.g. via an aperture (not shown) in the housing 108 of the inductive charger 100.

The housing 108 of the inductive charger 100 in this example provides a support structure for supporting the wrist watch 110, such that the inductive receiving coil 112 is positioned adjacent to the inductive charging coil 102. This can enable energy to be transferred from the inductive charging coil 102 to the inductive receiving coil 112. The housing 108 comprises a profiled surface for supporting the wrist watch 110 in a predetermined position to enable adequate charging of the wrist watch 110. Optionally, the profiled surface may support the wrist watch 110 in a predetermined alignment, or one of a plurality of predetermined alignments, to enable efficient charging of the wrist watch 110.

In this example, the housing 108 has a cone shaped outer surface, which is an example of a curved surface portion. That is, the housing 108 has a cross-sectional area that increases along its length from an electronic device receiving end 120 to a base 122. In the example shown, the cross-sectional area is shown as continuously increasing. In other examples, the cross-sectional area may increase stepwise/non-continuously.

The inductive charging coil 102 is adjacent to the cone shaped outer surface of the housing 108, the location of which is indicated by indicia 104. The indicia 104 are indicative of the location of the inductive charging coil 102. The indicia 104 may include a box, with associated text such as "charge here". Similarly, in some examples the wrist watch 110 may have corresponding indicia (not shown) for assisting a user in properly aligning the wrist watch 110 on the inductive charger 100.

In this example, the length of the strap 114 may be adjusted so that the circumference of the strap 114 and the display panel 118 corresponds to the circumference of the housing 108 of the inductive charger 100 in the vicinity of the inductive charging coil 102. Advantageously, the housing 108 can be used with different types and sizes of electronic devices that have straps. The support structure provided by the housing 108 can be engaged with the strap 114 such that the inductive receiving coil 112 is positioned adjacent to the inductive charging coil 102. The inductive charging coil 102 may be in a fixed position along the length of the housing 108, or it may be movable along the length of the housing 108 such that it can be associated with regions of the housing that have different circumferences, and therefore can be used with electronic devices with different strap lengths.

In some examples, the housing 108 can include a profiled surface that comprises a curved surface portion (such as an outer surface of a cone), and a substantially planar/flat surface portion (not shown). The inductive charging coil 102 can be positioned adjacent to the substantially planar surface portion in order for the inductive charging coil 102 and the inductive receiving coil 112 to be located close together, which can increase the coupling between the two coils. The substantially planar portion may be a region of a cone that has a cross-section that varies in a step-wise manner.

The inductive charger 100 can advantageously be portable. That is, it may not require any connections to a fixed energy supply, such as a mains electricity supply. Providing the fuel cell 106 and the inductive charging coil 102 in a common housing can conveniently enable the inductive charger 100 to be a self-contained energy supply that may not include any exposed electrical connections.

It will be appreciated that in other examples, the inductive charger can be provided with a different support structure/housing that is suitable for inductively charging one or more of the following types of electronic devices: mobile phones, smart phones, toothbrushes, tablets, portable media players, etc.

Figure 2:
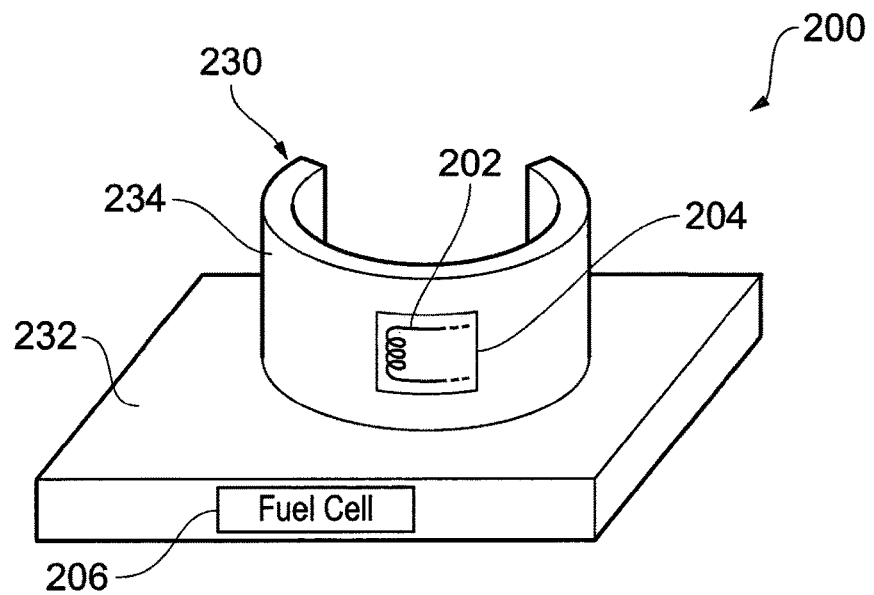
FIG. 2 shows a further inductive charger for a wrist watch.

FIG. 2 shows another inductive charger 200 that can be used with a wrist watch, such as the one illustrated in FIG. 1. The inductive charger 200 includes a fuel cell 206 and an inductive charging coil 202 that operate in the same way as the corresponding components that are described above with reference to FIG. 1.

In this example, the support structure is provided by a device locating member 230, which is associated with a base 232. The inductive charging coil 202 is housed within the device locating member 230. The fuel cell is housed within the base 232. Optionally, the inductive charger 200 also includes a movable/removable lid (not shown), which may be rotatably connected to the base 232 so that the lid can move between an open and a closed position. When the lid is in the open position, a wrist watch on the device locating member 230 will be visible. When the lid is in the closed position, a wrist watch on the device locating member 230 will be obscured from view. In this way, the inductive charger 200 can have the appearance of a jewellery style casing/display box and can be used to protect the wrist watch when it is being charged.

The device locating member 230 has an outward facing curved surface 234, which will be in contact with an inner surface of a watch strap and/or a display panel when a wrist watch is placed over the device locating member 230 for charging. In this example, the device locating member 230 is a subsection of a hollow cylinder, and the outward facing curved surface 234 is a portion of a cylindrical surface. The outward facing curved surface 234 may have a flat spot (not shown) in the vicinity of the inductive charging coil 202, as identified by indicia 204. The flat spot is an example of a substantially planar surface portion. The cylinder does not necessarily need to be circular, it could be elliptical, or any other shape. When viewed in a longitudinal direction, the cylindrical device locating member 230 can be incomplete, which means that it can take the shape of an arc.

The device locating member 230 can be connected directly to the base 232, as shown in FIG. 2. Alternatively, the device locating member 230 can be spaced apart from the base 232, and optionally connected by a mechanical joining member. Such a mechanical joining member can house wiring for electrically connecting the fuel cell 206 to the inductive charging coil 202. It will be appreciated that the device locating member 230 can be orientated such that its longitudinal axis is perpendicular to a planar surface of the base 232 (as shown in FIG. 2) or can be oriented such that its longitudinal axis is parallel to a planar surface of the base 232.

Although the illustrated embodiments of FIGS. 1 and 2 relate to a charger for an electronic device in the form of a wrist watch, the electronic device can be any type of portable electronic device that includes one, some, or all of the following features: a short range communication device (e.g. Bluetooth enabled) for interfacing with a user's smart phone, computer, tablet or other data processing device which may be disposed nearly; a short range communication device (e.g. wi-fi enabled) device for communicating with the internet or wireless base station; a cellular telephone device; a GPS receiver for location sensing; an activity monitor incorporating sensors such as accelerometers for detecting activity of the user; a health monitor including sensors for detecting the physical condition of the user, or for communicating with and collecting data from sensors disposed elsewhere on or in the user's body; a display device; a microprocessor capable of processing information relating to GPS tracking, internet connectivity, short range wireless communication connectivity, health and activity sensed data, etc. More generally, the electronic device may be a personal communication device or a personal health and/or activity monitor.

The invention claimed is:

1. An inductive charger comprising:
    an inductive charging coil for providing energy to an inductive receiving coil; and,
    a fuel cell configured to provide electricity to the inductive charging coil;
    a support structure configured to support an electronic device comprising the inductive receiving coil such that the inductive receiving coil is positioned adjacent to the inductive charging coil, in use;
    wherein the support structure comprises a profiled surface for supporting the electronic device in a predetermined position;
    wherein the profiled surface is an outer surface of a cone shaped housing; and,
    wherein the inductive charging coil is movable along the length of the cone shaped housing such that it can be associated with regions of the cone shaped housing that have different circumferences.

2. The inductive charger of claim 1, further comprising a housing that houses both the inductive charging coil and the fuel cell.

3. The inductive charger of claim 1, wherein the inductive charger is portable.

4. The inductive charger of claim 1, wherein the support structure comprises a profiled surface for supporting the electronic device in a predetermined alignment.

5. The inductive charger of claim 1, wherein the profiled surface comprises a curved surface portion, and wherein the inductive charging coil is adjacent to the curved surface portion.

6. The inductive charger of claim 1, wherein the profiled surface comprises a curved surface portion and a substantially planar surface portion, wherein the inductive charging coil is adjacent to the substantially planar surface portion.

7. The inductive charger of claim 1, wherein the inductive charging coil is movable along the length of the cone shaped housing such that it can be associated with regions of the cone shaped housing that have different circumferences.

8. The inductive charger of claim 1, wherein the support structure comprises indicia that are indicative of the location of the inductive charging coil.

9. An inductive charger comprising a support structure configured to support an electronic device comprising an inductive receiving coil such that the inductive receiving coil is positioned adjacent to an inductive charging coil, in use;
    wherein the support structure comprises a device locating member and a base;
    wherein the device locating member houses the inductive charging coil and is configured to be engaged with the strap;
    wherein the base houses the fuel cell wherein the electronic device comprises a wrist-mountable electronic device, the wrist-mountable electronic device comprising a strap; and,
    wherein the support structure is configured to be engaged with the strap such that the inductive receiving coil is positioned adjacent to the inductive charging coil.

10. The inductive charger of claim 9, wherein the device locating member is a subsection of a hollow cylinder.

11. The inductive charger of claim 9, further comprising a movable lid that can move between an open position and a closed position relative to the base, wherein, when the lid is in the open position, an electronic device on the device locating member will be visible, and when the lid is in the closed position, an electronic device on the device locating member will be obscured from view.

* * * * *